(12) United States Patent
Uchida et al.

(10) Patent No.: US 6,464,176 B2
(45) Date of Patent: Oct. 15, 2002

(54) FLAP OPERATING DEVICE

(75) Inventors: Minoru Uchida; Hiroshi Yamanouchi; Wataru Yada; Hidetaka Nagano, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/911,372

(22) Filed: Jul. 25, 2001

(65) Prior Publication Data

US 2002/0047068 A1 Apr. 25, 2002

(30) Foreign Application Priority Data

Jul. 26, 2000 (JP) ........................................ 2000-231368
Jul. 26, 2000 (JP) ........................................ 2000-231369

(51) Int. Cl.[7] ................................................ B64C 9/11
(52) U.S. Cl. ..................................... 244/216; 244/75 R
(58) Field of Search ................................. 244/213–217, 244/219, 75 R

(56) References Cited

U.S. PATENT DOCUMENTS

| 3,874,617 A | * | 4/1975 | Johnson | 244/216 |
| 4,381,093 A | * | 4/1983 | Rudolph | 244/216 |
| 4,542,869 A | * | 9/1985 | Brine | 244/216 |
| 4,784,355 A | * | 11/1988 | Brine | 244/213 |
| 5,161,757 A | * | 11/1992 | Large | 244/216 |
| 5,836,550 A | * | 11/1998 | Paez | 244/214 |

* cited by examiner

Primary Examiner—Galen L. Barefoot
(74) Attorney, Agent, or Firm—Arent Fox Kintner Plotkin & Kahn, PLLC

(57) ABSTRACT

A flap mounted on a tapered main wing of an aircraft, is supported by at least two link units. The link units are formed into analogous shapes with an analogous size ratio equal to the ratio between corresponding chord lengths of the main wing. As a result, the amounts of protrusion of the flap are varied in the span direction in accordance with the analogous size ratio, and the flap performs a three-dimensional motion such that it is moved in the span direction while being retracted and lowered. Thus, the flap can be moved to protrude to an optimal position and through an optimal angle according to the chord lengths of the main wing. When the flap is a slotted flap, an appropriate slot width can be ensured at each of the portions in the span direction, whereby the aerodynamic characteristic of the flap mounted on the tapered main wing can be uniform in the span direction.

5 Claims, 9 Drawing Sheets

FIG.4 (DURING LANDING OF AIRPLANE)

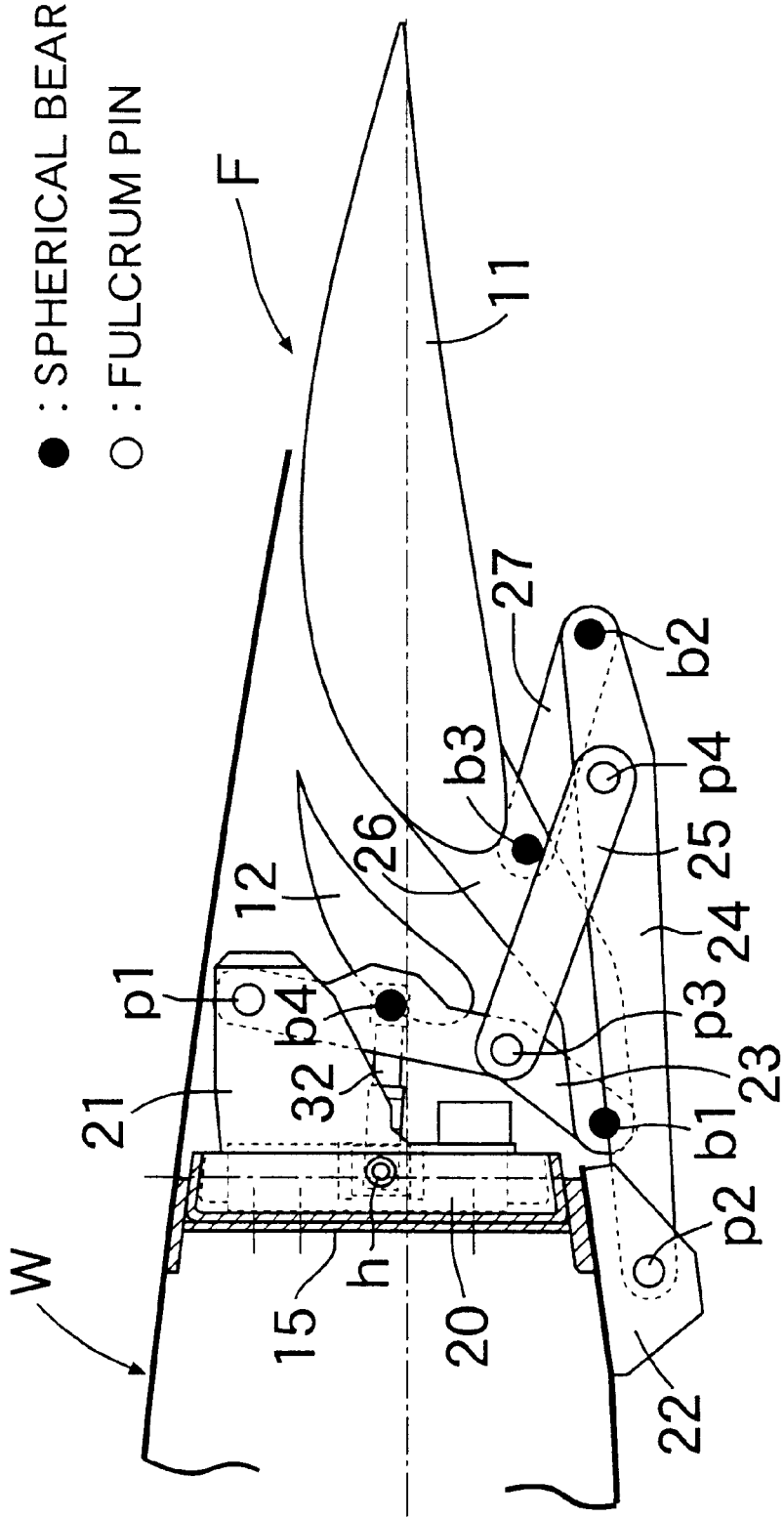

(DURING TAKING-OFF OF THE AIRPLANE)

◎ : UNIVERSAL JOINT
● : SPHERICAL BEARING
○ : FULCRUM PIN

FLAP OPERATING DEVICE

BACKGROUND OF THE INVENTION

1. Field of the Invention

The present invention relates to a flap operating device for lowering a flap mounted along a trailing edge of a tapered main wing, while moving the flap rearwards by means of at least two link units which are disposed at a distance from each other in a span direction.

2. Description of the Related Art

Such a flap operating device is known from U.S. Pat. No. 4,444,368. In the flap operating device, a flange link fixed to a leading edge of a flap is supported on a spar through a main link, a first positioning link, a programming link and a second positioning link, so that the flap is lowered while being moved rearwards by swinging the main link by means of an actuator.

In the conventional flap operating device, in general, a plurality of the same link units disposed at distances in the span direction to support the flap, are used and for this reason, the rearwards-protrusion amount of the flap is uniform in the span direction. In a tapered wing with its chord length gradually decreasing from the root toward the tip of the wing, if the rearwards-protrusion amount of the flap is uniform in the span direction, the following problem is encountered: the ratio of the rearwards protrusion amount of the flap protruding rearwards to the chord length is varied in the span direction, and as a result, the aerodynamic characteristic of the flap is not uniform in the span direction. Particularly, in a slotted flap having a slot defined between the main wing and a leading edge of the flap, if an optimal slot width is set on the side of a root, a slot width on the side of a tip is too large, and if an optimal slot width is set on the side of the tip, a slot width on the side of the root is too small. For this reason, it is difficult to sufficiently enhance the aerodynamic characteristic of the flap.

To solve this problem, it is considered that a plurality of flaps separated in the span direction are mounted, and the amounts of protrusion of the flaps are varied in accordance with the chord lengths of the main wing. In this case, however, the number of link units for operating the flap is increased, bringing about in increases in number of parts and in weight. A flap operating device is also known, which is designed so that the flap is guided by a guide rail without use of a link unit or link units. However, if it is intended to avoid that the guide rail interferes with the flap or another structure, there is encountered a problem that the degree of freedom of the design is limited.

SUMMARY OF THE INVENTION

Accordingly, it is an object of the present invention to make uniform the aerodynamic characteristic of the flap mounted on a tapered wing in the span direction.

To achieve the above object, according to a first aspect and feature of the present invention, there is provided a flap operating device for lowering a flap mounted along a trailing edge of a tapered main wing while moving the flap rearwards with at least two link units disposed at a distance from each other in the span direction, wherein each of the link units includes a swing arm pivotally supported at one end thereof for vertical swinging movement on an upper portion of a rear spar of the main wing through a first fulcrum pin, a carriage pivotally supported at one end thereof for vertical swinging movement on a lower portion of the rear spar of the main wing through a second fulcrum pin, and a mid-link pivotally supported at one end thereof on an intermediate portion of the swing arm through a third fulcrum pin and at the other end thereof on an intermediate portion of the carriage through a fourth fulcrum pin. A retainer is projectingly mounted at a leading edge of the flap and pivotally supported at its tip end at the other end of the swing arm through a first spherical bearing and a support link is pivotally supported at one end thereof at the other end of the carriage through a second spherical bearing and at the other end thereof at a base end of the retainer through a third spherical bearing. An actuator swings the swing arms through the same angle. The swing arms, the carriages, the mid-links, the retainers and the support links of the link units are disposed in analogous shapes having a predetermined size ratio.

With the above arrangement, each of the at least two link units supporting the flap at the trailing edge of the main tapered wing is comprised of the swing arm, the carriage, the mid-link, the retainer and the support link, and these components are disposed in analogous shapes having the predetermined size ratio. Therefore, when the swing arms of the link units are swung through the same angle by the actuator, the corresponding components of the link units can be swung through the same angle and hence, the flap integral with the retainers can be smoothly moved to protrude. The amount of protrusion of the flap, namely, the amount the retainer moves is determined by the size ratio of the link units and hence, the amount of protrusion of the flap can be changed in the span direction by selecting any size ratio. As a result, the aerodynamic characteristic of the flap can be established freely in each of the portions in the span dire, to thereby contribute to an enhancement in taking-off/landing performances.

When the amount of protrusion of the flap is changed in the span direction, the flap performs a three-dimensional motion such that the flap is moved in the span direction while being moved rearwards and lowered. This three-dimensional motion of the flap can be carried out without hindrance by effecting the interconnection of the swing arm and the retainer, the interconnection of the carriage and the support link and the interconnection of the support link and the retainer through the spherical bearings, respectively. Moreover, the link units are disposed to the rear of the rear spar of the main wing and hence, the link units do not interfere with structures such as a fuel tank and the like disposed in front of the rear spar.

According to a second aspect and feature of the present invention, the size ratio is equal to the ratio between chord lengths of the main wing corresponding to the positions of the link units.

With the above arrangement, the size ratio between the link units formed in the analogous shapes is equal to the ratio between chord lengths of the main wing corresponding to the positions of the link units and therefore, the rearwards-movement amount of the flap can be increased in an area corresponding to the larger chord length of the main wing, and decreased in an area corresponding to the smaller chord length of the main wing. Thus, the flap can be allowed to protrude to an optimal position and through an optimal angle according to the chord length of the main wing at the portions of the main wing in the span direction. Particularly, when the flap is a slotted flap, an appropriate slot width can be ensured at the portions in the span direction.

According to a third aspect and feature of the present invention, the ratio between chord lengths of the flap corresponding to the positions of the link units is equal to the ratio between the chord lengths of the main wing corresponding to the positions of the link units.

With the above arrangement, a ratio of the chord length of the main wing to the chord length of the flap, is uniform in the link units, and a ratio of the chord length of the main wing to the rearwards-movement amount of the flap, is uniform in the link units. Therefore, the aerodynamic characteristic of the flap can be uniform in the portions in the span direction.

According to a fourth aspect and feature of the present invention, there is provided a flap operating device for lowering a flap mounted along a trailing edge of a tapered main wing while moving the flap rearwards with at least two link units disposed at a distance from each other in a span direction, wherein each of the link units includes a swing arm pivotally supported at one end thereof for vertical swinging movement on an upper portion of a rear spar of the main wing through a first fulcrum pin, a carriage pivotally supported at one end thereof for vertical swinging movement on a lower portion of the rear spar of the main wing through a second fulcrum pin, a mid-link pivotally supported at one end thereof on an intermediate portion of the swing arm through a third fulcrum pin and at the other end thereof on an intermediate portion of the carriage through a fourth fulcrum pin. A retainer is projectingly mounted at a leading edge of the flap and pivotally supported at its tip end at the other end of the swing arm through a first spherical bearing, a support link is pivotally supported at one end thereof at the other end of the carriage through a second spherical bearing and at the other end thereof at a base end of the retainer through a third spherical bearing. A drive arm has first and second arm portions extending radially from a pivot, and a push rod is pivotally supported at one end thereof on the second arm portion of the drive arm through a universal joint and at the other end thereof on the intermediate portion of the swing arm through a fourth spherical bearing. The swing arms, the carriages, the mid-links, the retainers and the support links of the link units are disposed in analogous shapes having a size ratio equal to the ratio between chord lengths of the main wing corresponding to positions of the link units. The second arm of the drive arm, the push rod and a portion of the swing arm between the first fulcrum pin and the fourth spherical bearing in each of the link units are disposed in analogous shapes having any size ratio, the first arm portions of the drive arms in the link units being interconnected by a connecting rod. Therefore, the link units are swung through the same angle by an actuator.

With the above arrangement, each of the at least two link units supporting the flap at the trailing edge of the tapered main wing is comprised of the swing arm, the carriage, the mid-link, the retainer, the support link, the drive arm and the push rod, and among these components, the swing arm, the carriage, the mid-link, the retainer and the support link are disposed in analogous shapes having a size ratio equal to the ratio between the chord lengths of the main wing corresponding to the positions of the link units. Therefore, when the swing arms of the link units are swung through the same angle by the actuator, the corresponding components of the link units can be swung through the same angle and hence, the flap integral with the retainer can be moved smoothly to protrude. The amount of protrusion of the flap is varied in a span direction in proportion to the chord lengths of the main wing and hence, the aerodynamic characteristic of the flap can be established freely in each of the portions in the span dire, to thereby contribute to an enhancement in taking-off/landing performances.

In addition, in the link units, the second arm portions of the drive arms and the portions of the swing arm between the first fulcrum pin and the fourth spherical bearing are disposed in analogous shapes having a certain size ratio. Therefore, the swing arms can be swung through the same angle to smoothly operate the flap F by connecting the first arm portions of the drive arms to each other by the connecting rod and swinging the first arm portions through the same angle.

Moreover, the link units are disposed in the rear of the rear spar of the main wing and hence, there is not a possibility that they will interfere with structures such as a fuel tank and the like disposed in front of the rear spar.

According to a fifth aspect and feature of the present invention, when an aerodynamic load is applied to the flap, the connecting rod receives a tensile strength.

With the above arrangement, the connecting rod receives the tensile strength due to the aerodynamic load applied to the flap and hence, even if the connecting rod is formed of a thin and lightweight material, a sufficient strength can be ensured.

The first to fourth ball joints b1 to b4 in an embodiment correspond to the first to fourth spherical bearings of the present invention. A hooke's joint h in the embodiment corresponds to the universal joint of the present invention. A hydraulic cylinder 31 in the embodiment corresponds to the actuator of the present invention.

The above and other objects, features and advantages of the invention will become apparent from the following description of the preferred embodiment taken in conjunction with the accompanying drawings.

BRIEF DESCRIPTION OF THE DRAWINGS

FIGS. 1 to 8 show an embodiment of the present invention, wherein

FIG. 1 is a plan view of a left main wing of an airplane;

FIG. 2 is a plan view of a flap in an expanded state and a flap operating device;

FIG. 3 is a perspective view of the flap in the expanded state and the flap operating device;

FIG. 4 is an enlarged sectional view (during landing of the airplane) taken along a line 4—4 in FIG. 2;

FIG. 5 is a perspective view of a portion of a link unit;

FIG. 7 is a view showing the flap in a state during flight of the airplane;

FIG. 8 is a view showing the flap in a state during taking-off of the airplane;

DESCRIPTION OF THE PREFERRED EMBODIMENT

The present invention will now be described by way of an embodiment with reference to FIGS. 1 to 8.

Figure 1:
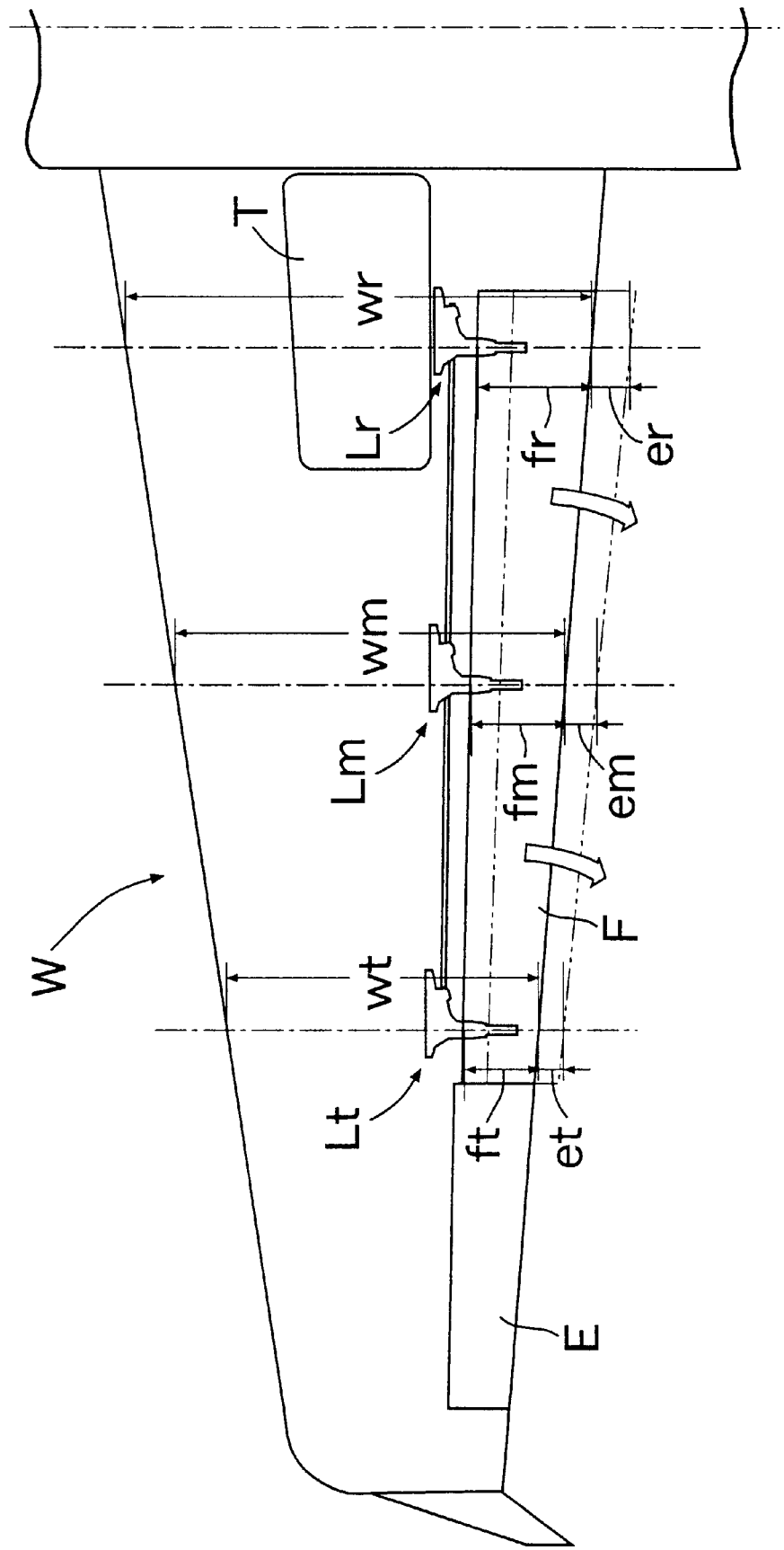
Figure 2:
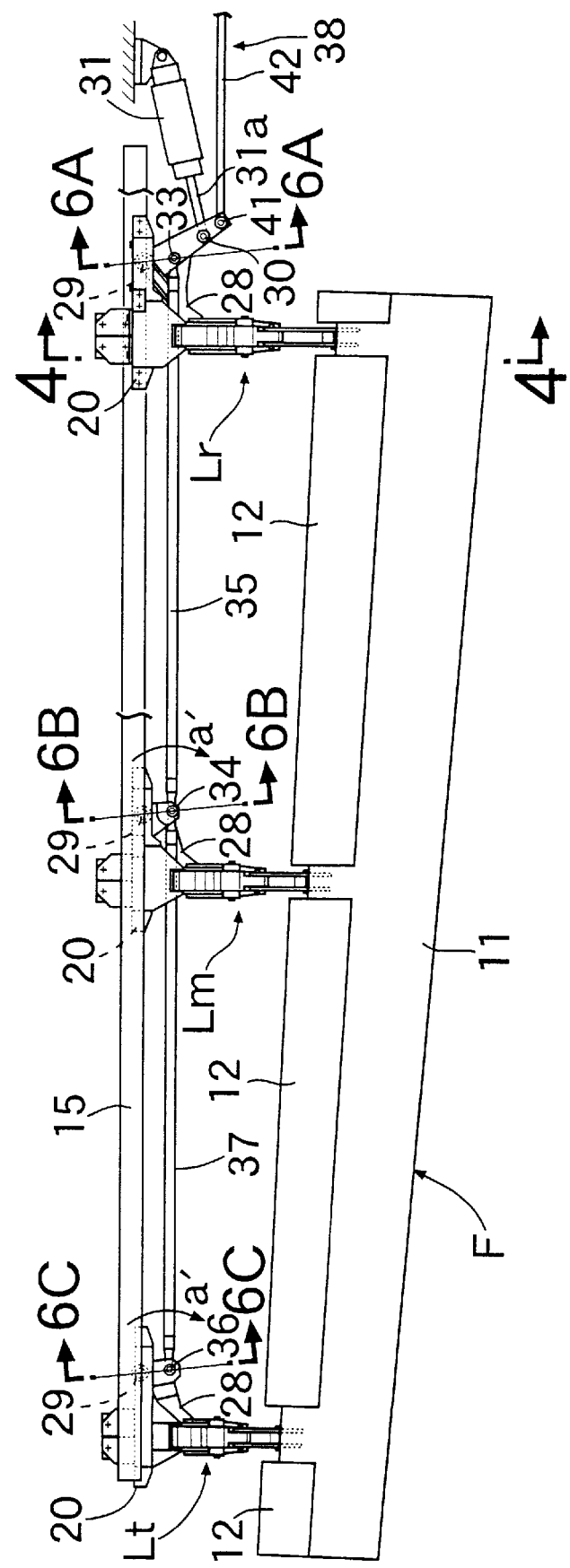

As shown in FIGS. 1 and 2, a main wing W of an airplane is a tapered wing having straight leading and trailing edges. The trailing edge is provided with a flap F located at a root, and an aileron E located at a tip. Chord lengths fr, fm and ft of the flap F are uniformly 25% of chord lengths wr, wm and wt of the main wing W and hence, the planar shape of the flap F is also tapered from the root to the tip. The flap F is a double slotted flap having stator vanes 12 at an upper portion of the leading edge of a flap body 11. The flap F is adapted to be housed (see FIG. 7) during flying of the airplane, to be lowered (see FIG. 8) while protruding rearwards during taking-off of the airplane, and to be lowered (see FIG. 4) while further protruding rearwards during landing of the airplane. The stator vane 12 is integrally fixed to the flap body 11 with a stay interposed therebetween. In an expanded state of the flap F shown in FIGS. 4 and 8, slots 13 and 14 are respectively defined between an upper surface of the main swing W and the stator vane 12 and between the stator vane 12 and the flap body 11, so that air flow blows through the slots 13 and 14 from a lower surface to the upper surface of the main wing W, thereby providing an increase in lifting power, while inhibiting an increase in drag.

Three link units supporting the flap F at a rear portion of a rear spar 15 of the main wing W are a first link unit Lr located at the root, a second link unit Lm located at an intermediate portion of the main wing W, and a third link unit Lt located at the tip. The link units Lr, Lm and Lt are of the substantially same structure, but are different in size from one another and formed into analogous shapes getting smaller from the root to the tip of the wing W. More specifically, if the chord lengths of the main wings in positions where the first, second and third link units Lr, Lm and Lt are located are represented by wr, wm and wt, the analogous size ratio between the link units Lr, Lm and Lt analogous in shape to one another is set at wr:wm:wt, and the ratio between the chord lengths fr, fm and ft of the flap F (the flap body 11) corresponding to the positions of the link units Lr, Lm and Lt is also set at wr:wm:wt. Therefore, upon expansion of the flap F (both during taking-off and during landing of the airplane), the ratio between the amounts er, em and et of protrusion of portions of the flap F corresponding to the positions of the link units Lr, Lm and Lt is likewise at wr:wm:wt.

In the embodiment, wr:wm:wt is 100:85:70. Namely, the size of the third link unit Lt is two third of the first link unit Lr, and the size of the second link unit Lm is midway between those of the first and third link units Lr and Lt.

Therefore, the flap F is displaced slightly in a direction toward the tip while protruding rearwards of the airplane body, as shown in an emphasized manner by white arrows in FIG. 1, rather than protruding straight rearwards of the airplane body as viewed in a plane. Namely, the conventional flap is moved in a two-dimensional motion during expansion thereof, i.e., lowered, while protruding rearwards, whereas the flap F in the present invention is moved in a three-dimensional motion, i.e., moved leftwards (or rightwards) while being moved rearwards and downwards upon expansion thereof. The amounts of protrusion of the portions of the flap F corresponding to the positions of the link unit Lr, Lm and Lt are different from one another, but it is of course that the angle of lowering of the flap F is uniform in the span direction. This is because even if the distances of movement of the link units Lr, Lm and Lt analogous in shape to one another, are different from one another in accordance with the analogous size ratio, the angles of rotation of the link units are equal to one another.

As described above, the three link units Lr, Lm and Lt located in the different positions in the span direction are formed into analogous shapes with an analogous size ratio equalized to the ratio between the chord lengths wr, wm and wt corresponding to the positions of the link units Lr, Lm and Lt. Therefore, the ratio between the amounts er, em and et of protrusion of the portions of the flap F corresponding to the positions of the link units Lr, Lm and Lt and the ratio between the sizes of the slot 13 defined between the upper surface of the main wing W and the stator vane 12 can be equalized to the ratio between the chord lengths wr, wm and wt. Thus, an aerodynamic characteristic for the flap F can be set optimally over the entire area in the span direction, which can contribute to an enhancement in taking-off and landing performances of the airplane.

All of the three link units Lr, Lm and Lt are disposed at the rear portion of the rear spar 15 of the main wing W and hence, the capacity of a fuel tank T disposed at a front portion of the rear spar 15 within the main wing W is not decreased due to the space for disposition of the link unit Lr, Lm and Lt. Thus, it is possible to ensure the sufficient capacity of the fuel tank T to contribute to an increase in continuous flight distance of the aircraft.

The structures of the three link units Lr, Lm and Lt will be described below with reference to FIGS. 2 to 6C. All the three link units Lr, Lm and Lt are of analogous shapes and of substantially the same structure and hence, mainly, the first link unit Lr closest to the root will be described below.

Figure 4:
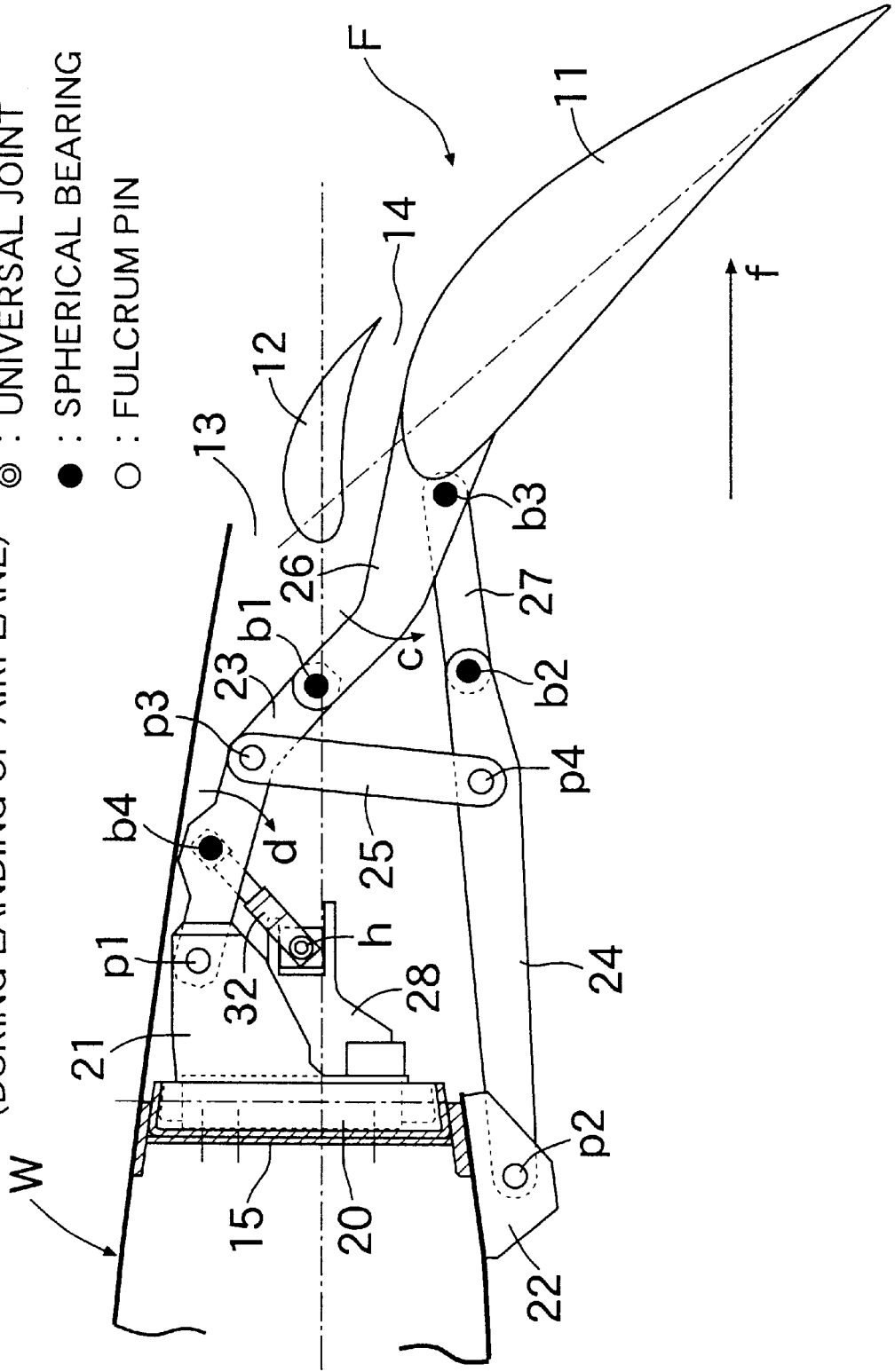

As shown in FIG. 4, the first link unit Lr supported on the rear spar 15 includes a swing arm bracket 21 mounted at an upper portion of a rear surface of a base member 20 fixed to a rear surface of the rear spar 15, and a carriage bracket 22 mounted on a lower surface of the rear spar 15. A swing arm 23 is pivotally supported at one end thereof on the swing arm bracket 21 through a first fulcrum pin p1, and a carriage 24 is pivotally supported at one end thereof on the carriage bracket 22 through a fulcrum pin p2. The swing arm 23 and the carriage 24 are also pivotally supported at their intermediate portions on opposite ends of a mid-link 25 through third and fourth fulcrum pins p3 and p4, respectively.

A retainer 26 integrally extends from a leading edge of the flap body 11 and is pivotally supported at its tip end on the other end of the swing arm 23 through a first ball joint b1 which is a spherical bearing. The other end of the carriage 24 and a base end of the retainer 26 are pivotally supported at opposite ends of a support link 27 through second and third ball joints b2 and b3 of the same type as the first ball joint b1.

As can be seen from FIGS. 2, 5 and 6A to 6C, a drive arm 28 for driving the swing arm 23 of the first link unit Lr is swingably supported on the base member 20 through a vertically extending pivot 29. The drive arm 28 has a first arm portion 28a and a second arm portion 28b extending radially from an axis of the pivot 29 to form an angle of 90° therebetween, and an output rod 31a of a hydraulic cylinder 31 is pivotally supported on the first arm portion 28a through a fulcrum pin 30. A push rod 32 is pivotally supported at one end thereof at a tip end of the second arm portion 28b of the drive arm 28 through a hooke's joint h which is one type of a universal joint, and at the other end thereof at the intermediate portion of the swing arm 23 through a fourth ball joint b4 which is a spherical bearing.

In order to drive the drive arm 28 for the second link unit Lm and the drive arm 28 for the third link unit Lt in operative association with the drive arm 28 for the first link arm Lr, a fulcrum pin 33 provided in the drive arm 28 for the first link unit Lr and a fulcrum pin 34 provided in the drive arm 28 for the second link unit Lm are connected to each other through a connecting rod 35, and the fulcrum pin 34 provided in the drive arm 28 for the second link unit Lm and a fulcrum pin 36 provided in the drive arm 28 for the third link unit Lt are connected to each other through a connecting rod 37.

Figure 3:
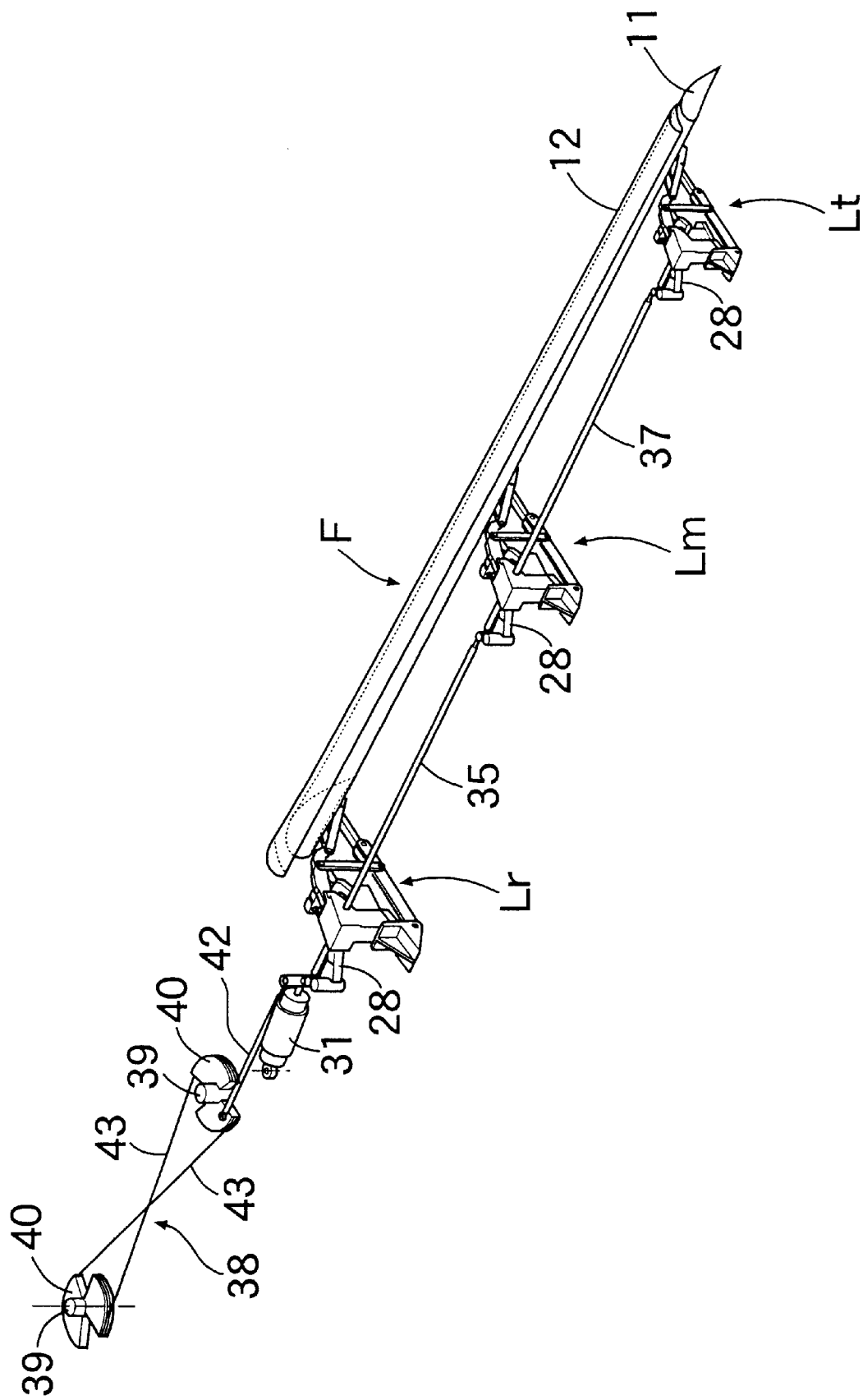

The flap F of the left main wing W and the flap F of the right main wing W are driven by corresponding hydraulic cylinders 31, 31, but in order to operate the left and right flaps F, F synchronously, the drive arms 28, 28 for the left and right first link units Lr, Lr are connected to each other by a synchronizing mechanism 38. As shown in FIGS. 2 and 3, the synchronizing mechanism 38 is comprised of left and right quadrants 40, 40 pivotally supported on support shafts 39, 39, left and right synchronizing rods 42, 42 which connect the left and right quadrants 40, 40 to the fulcrum pins 41, 41 of the drive arms 28, 28 for the left and right first link units Lr, Lr, and two synchronizing cables 43, 43 for connecting the left and right quadrants 40, 40 to each other in an X-shape.

Figure 5:
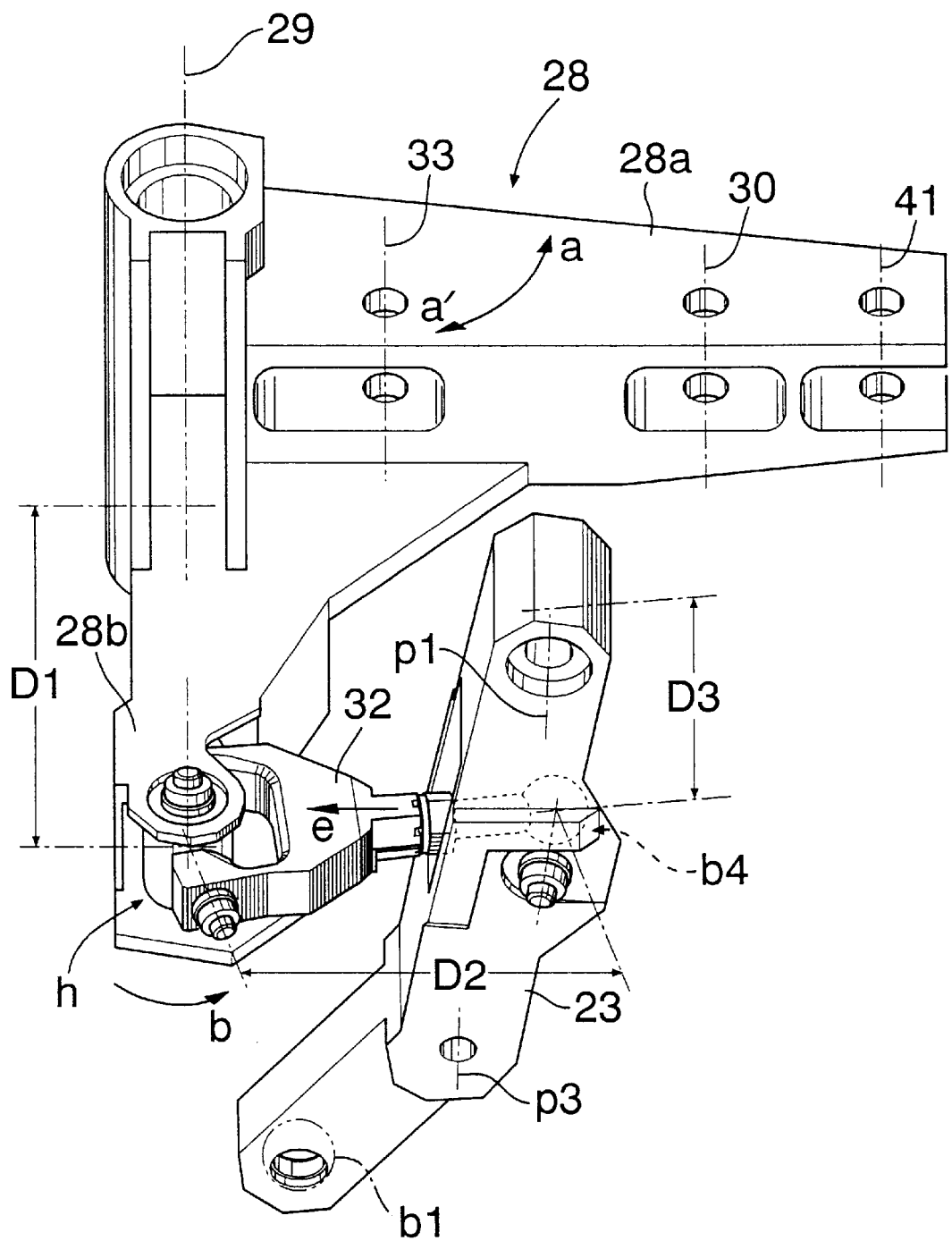
Figure 6A:
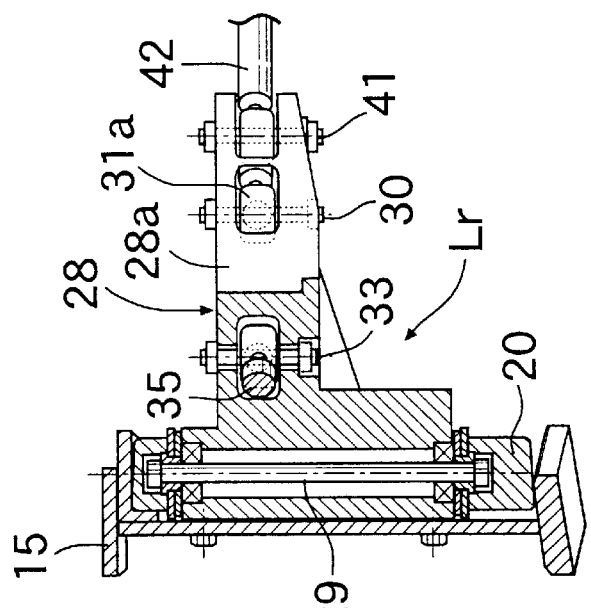
FIGS. 6A, 6B and 6C are enlarged sectional views taken along lines 6A—6A, 6B—6B and 6C—6C in FIG. 2, respectively.
Figure 6B:
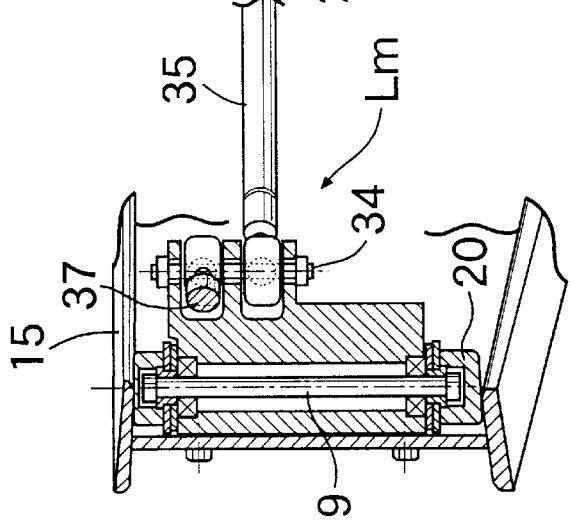
Figure 6C:
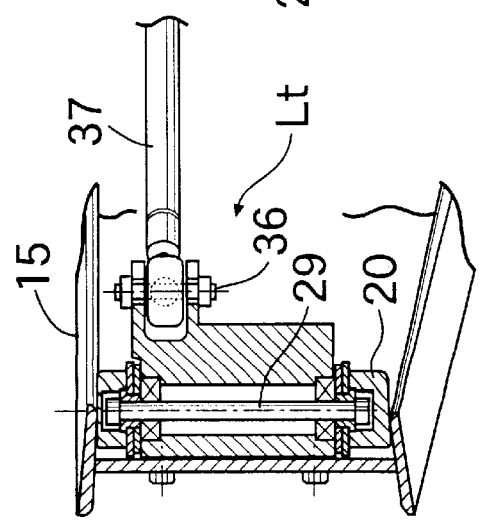
Figure 8:
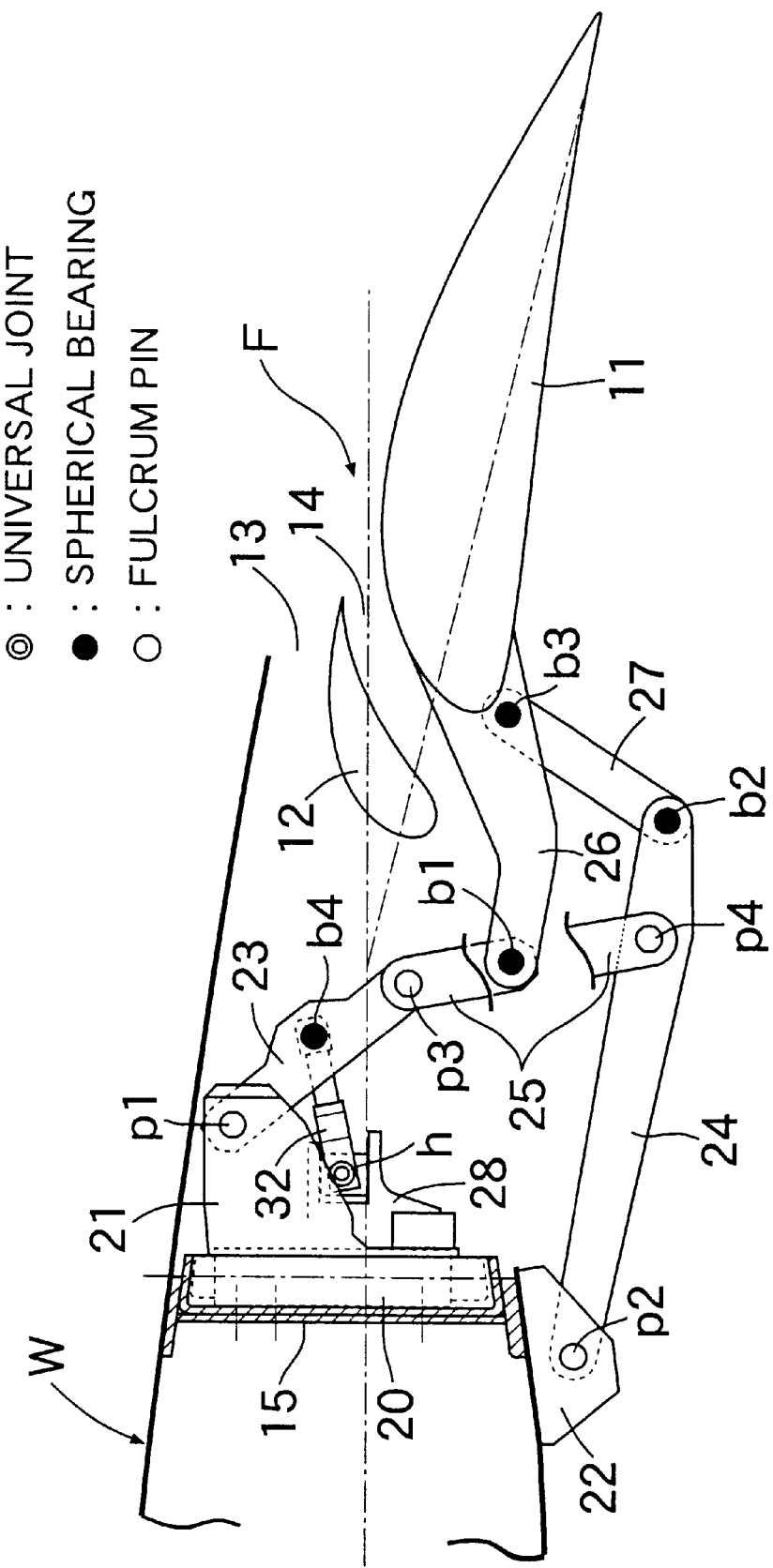
Figure 9:
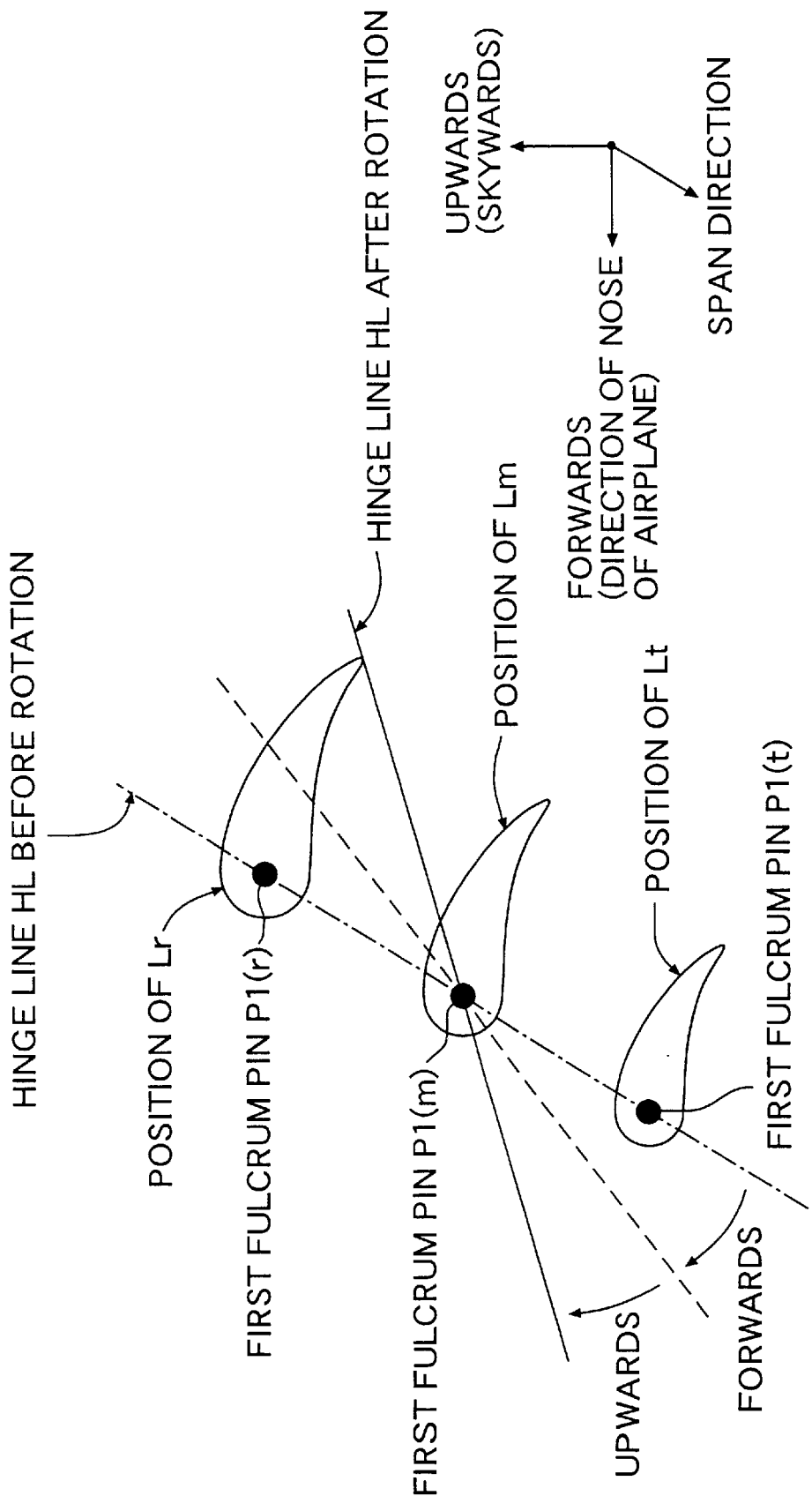
FIG. 9 is a diagram for explaining the disposition of link units in the embodiment in which the main wing has a wash-out.

In the drive arms 28 for the first, second and third link units Lr, Lm and Lt, the distances from the fulcrum pins 33, 34 and 36 connected to the connecting rods 35 and 37 to the pivots 29 are set at the same value and hence, the angles of rotation of the three drive arms 28 are uniform. Therefore, if the drive arms 28, the push rods 32 and the swing arms 23 for the first, second and third link units Lr, Lm and Lt are formed into analogous shapes, as shown in FIG. 5, namely, if a distance D1 between the pivot 29 and the hooke's joint h, a distance D2 between the hooke's joint h and the fourth ball joint b4 and a distance D3 between the fourth ball joint b4 and the first fulcrum pin p1 are in an analogous relationship, the three swing arms 23 can be rotated through the same angle, when the three drive arms 28 are rotated through the same angles.

In the embodiment, all of the three link units Lr, Lm and Lt are of the analogous shapes with the analogous size ratio equalized to the ratio between the chord lengths wr, wm and wt corresponding to the positions of the link units Lr, Lm and Lt. However, the analogous size ratio between the three components: the drive arms 28, the push rods 32 and the swing arms 23 (portions between the fourth ball joints b4 and the first fulcrum pin p1) for the first, second and third link units Lr, Lm and Lt is not necessarily equalized to the ratio between the chord lengths wr, wm and wt, and may be set at a different value. This is because if the three swing arms 23 are rotated through the same angles about the first fulcrum pins p1 upon rotation of the three drive arms 28 for the first, second and third units Lr, Lm and Lt through the same angle, the flap can be operated without hindrance.

When the flap F is in its retracted state, the hydraulic cylinder 31 is in its expanded state. When the hydraulic cylinder 31 is contracted from this state, the first and second arm portions 28a and 28b of the drive arm 28 are swung in directions of arrows a and b in FIG. 5 about the pivot 29, respectively. As a result, the swing arm 23 pushed up by the push rod 32 is swung from a substantially vertical attitude shown in FIG. 7 via an inclined attitude shown in FIG. 8 to a substantially horizontal attitude shown in FIG. 4. When the other end of the swing arm 23 is swung rearwards and upwards, the front end of the retainer 26 protruding forwards from the flap body 11 is pushed rearwards and upwards. With the rearward and upward swinging movement of the swing arm 23, the carriage 24 connected to the swing arm 23 through the mid-link 25 is swung slightly downwards from a substantially horizontal position shown in FIG. 4 to a position shown in FIG. 8 and then restored to a substantially horizontal position shown in FIG. 7. The other end of the support link 27 pivotally supported at one end thereof at the other end of the carriage 24 is moved rearwards drawing an upward-convex arcuate locus.

As a result, the flap F is moved from a flight state shown in FIG. 7 to a taking-off state (see FIG. 8) in such a manner that the trailing edge is moved downwards while the entire flap F is moved largely rearwards. The flap F is moved from this state to a landing state (see FIG. 4) in such a manner than the trailing edge is moved further downwards while the entire flap F is moved further rearwards. In the landing state, the stator vane 12 of the flap F is exposed rearwards from the rear end of an outer plate on the upper face of the main wing W.

In the first, second and third link units Lr, Lm and Lt, the three analogous positions corresponding to one another (e.g., the positions of the three first fulcrum pins p1 of the first, second and third link units Lr, Lm and Lt) are arranged on the same straight line, and the corresponding link elements 23, 24, 25, 26 and 27 of the first, second and third link units Lr, Lm and Lt are arranged so that they are in parallel when viewed in side plane. The swing arms 23, the carriages 24 and the mid-links 25 of the link units Lr, Lm and Lt are swung in planes perpendicular to the above-described same straight line. On the other hand, during taking-off and landing of the airplane, the amount of rearwards-movement of the link unit Lr is larger, and the amount of rearwards-movement of the link unit Lt is smaller, as shown in emphasis by white arrows in FIG. 1, in accordance with the analogous size ratio between the first, second and third link units Lr, Lm and Lt of the analogous shapes and hence, the flap F performs the three-dimensional motion such that it is moved slightly in the direction toward the tip, while protruding rearwards and downwards. Therefore, the stay 26 integral with the flap F and the support link 27 connecting the stay 26 to the carriage 24 are swung while being slightly displaced from the plane perpendicular to the above-described straight line.

However, since the tip end of the retainer 26 is pivotally supported at the other end of the swing arm 23 through the first ball joint b1, and the other end of the carriage 24 and the base end of the retainer 26 are pivotally supported at the opposite ends of the support link 27 through the second and third ball joints b2 and b3, respectively, the three-dimensional motion of the flap F is conducted without hindrance under the actions of the first, second and third ball joints b1, b2 and b3.

Even if a load in the span direction is applied to the flap F, there is not a possibility that the flap F is moved in the span direction due to the load, because the three retainers 26 of the first, second and third link units Lr, Lm and Lt are fixed rigidly to the flap body 11, and one end of each of the three swing arms 23 is supported on the corresponding swing arm bracket 21 by the corresponding first fulcrum pin p1 while the other end is prevented from being moved in the span direction.

When the flap F in the expanded state, receives an aerodynamic load indicated by an arrow f in FIG. 4, the retainer 26 fixed to the flap body 11, receives a moment in a direction of an arrow c about the third ball joint b3, and the swing arm 23 connected to the retainer 26 through the first ball joint b1 receives a moment in a direction of an arrow d about the first fulcrum pin p1. As a result, the push rod 32 receives a compressive force in a direction of an arrow e in FIG. 5, and the drive arm 28 receives a moment in a direction of an arrow a' in FIG. 5. The moment in the direction of the arrow a' acts not only on the drive arm 28 for the first link unit Lr, but also on the drive arms 28, 28 for the second and third link units Lm and Lt (see FIG. 2).

Such moment acting on the drive arms 28 generates a tensile force on the connecting rods 35 and 37 and hence, even if the connecting rods 35 and 37 are formed of a thin and lightweight material, a sufficient strength can be ensured. Particularly, if each of the ends of the connecting rods 35 and 37 is supported on a spherical bearing, a bending moment is not applied to the rods 35 and 37 and hence, a further reduction in weight can be achieved.

When the airplane is on the ground, the force of gravity is applied to the flaps F, F in a direction opposite from the aerodynamic load and hence, the compressive load acts on the connecting rods 35 and 37. Therefore, the connecting rods 35 and 37 are required to be rigid enough not to be buckled by the compressive force, but the load due to the force of gravity is very small, as compared with the aerodynamic load f and hence, there is not a possibility that the weights of the connecting rods 35 and 37 are increased substantially.

The flap-operating device according to the above-described embodiment includes the three link units Lr, Lm and Lt, but the number of the link units is not limited to three, and the provision of at least two link units suffices.

In the embodiment, the analogous size ratio between the three link units Lr, Lm and Lt is set at the ratio wr:wm:wt between the chord lengths of the corresponding main wing W, but the analogous size ratio can be set at any ratio. When the number of the link units is two, the flap F can be operated even if the analogous size ratio is set at any ratio. However, when the number of the link units is three or more, it is required that a reference unit link be provided, and the analogous size ratio is changed according to the distance from the reference link unit.

For example, if the analogous size of the second link unit spaced at a distance D apart from the first link unit as the reference link unit is 90% of the first link unit, it is required that the analogous size of the third link unit spaced at a distance 2D apart from the first link unit is set at 80% of the first link unit, and the analogous size of the fourth link unit spaced at a distance 3D apart from the first link unit is set at 70% of the first link unit. This means that a line connecting corresponding points of the link units (e.g., positions of the fulcrum pins P1 to p4, the hooke's joint h, the ball joints b1 to b4) is a straight line rather than a folded or bent line.

In the embodiment, the main wing W has no wash-out, but the present invention is applicable to a main wing having a wash-out. The angles of attack at portions of the main wing W in the span direction are gradually decreasing from the root to the tip due to the wash-out. Therefore, if the first to third link units Lr, Lm and Lt are mounted on the basis of wing sections in their positions, the attitudes of the first to third link units Lr, Lm and Lt as viewed in the span direction are different from one another depending on the wash-out, and the amount of rearwards-movement of the flap F, the slot width and the steering angle are varied at each wing section.

To avoid this, the innermost first link unit Lr is moved downwards and rearwards, and the outermost third link unit is moved upwards and forwards, in accordance with the wash-out, about the central first fulcrum pin P1(m) located on a hypothetical hinge line HL connecting the first fulcrum pins P1(r), P1(m) and P1(t) of the first to third link units Lr, Lm and Lt. This enables the flap F to be operated without hindrance. Moreover, the amount of rearwards-movement of the flap F, the slot width and the steering angle can be controlled to aerodynamically optimal values in each position of the first to third link units Lr, Lm and Lt.

In addition, the double slotted flap having the stator vane 12 has been illustrated in the embodiment, but the present invention is applicable to a triple slotted flap having two stator vanes 12, a slotted flap having no stator vane 12, or a fowler flap having no slot defined between the main wing and the flap.

Each of the first to fourth ball joints b1 to b4 and the hooke's joint h can be replaced by any other type of universal joint.

The actuator for operating the flap F is not limited to the hydraulic cylinder 31 used in the embodiment, and any other type of hydraulic actuator or electric actuator can be employed.

Further, the present invention is applicable to a retractable wing or advanceable wing, if it is a tapered wing.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A flap operating device for an aircraft having a tapered main wing including a rear spar, the flap operating device lowering a flap mounted along a trailing edge of the tapered main wing while moving the flap rearwards, the flap operating device having at least two link units separated at a distance from each other in the span direction of the wing, each of the link units comprising a first fulcrum pin, a swing arm pivotally supported at one end thereof for vertical swinging movement on an upper portion of the rear spar of the main wing by the first fulcrum pin, a second fulcrum pin, a carriage pivotally supported at one end thereof for vertical swinging movement on a lower portion of the rear spar of the main wing by the second fulcrum pin, a third fulcrum pin, a fourth fulcrum pin, a mid-link pivotally supported at one end thereof on an intermediate portion of the swing arm by the third fulcrum pin and at the other end thereof on an intermediate portion of the carriage by the fourth fulcrum pin, a first spherical bearing, a retainer projectingly mounted at a leading edge of the flap and pivotally supported at the tip end thereof at the other end of the swing arm by the first spherical bearing, a second spherical bearing, a third spherical bearing, a support link pivotally supported at one end thereof at the other end of the carriage by the second spherical bearing and at the other end thereof at a base end of the retainer by the third spherical bearing, and an actuator for swinging the swing arms through the same angle, wherein the swing arms, the carriages, the mid-links, the retainers and the support links of the link units are disposed in analogous shapes having a predetermined size ratio.

2. A flap operating device according to claim 1, wherein the size ratio is equal to the ratio between chord lengths of the main wing at the positions of the link units.

3. A flap operating device according to claim 2, wherein the ratio between chord lengths of the flap at the positions of the link units is equal to the ratio between the chord lengths of the main wing at the positions of the link units.

4. A flap operating device for an aircraft having a tapered main wing including a rear spar, the flap operating device for lowering a flap mounted along a trailing edge of the tapered main wing while moving the flap rearwards, the flap operating device having at least two link unit separated by a distance from each other in the span direction of the wing and a connecting rod, each of the link units comprising a first fulcrum pin, a swing arm pivotally supported at one end thereof for vertical swinging movement on an upper portion of the rear spar of the main wing by the first fulcrum pin, a second fulcrum pin, a carriage pivotally supported at one end thereof for vertical swinging movement on a lower portion of the rear spar of the main wing by the second fulcrum pin, a third fulcrum pin, a fourth fulcrum pin, a mid-link pivotally supported at one end thereof on an intermediate portion of the swing arm by the third fulcrum pin and at the other end thereof on an intermediate portion of the carriage by the fourth fulcrum pin, a first spherical bearing, a retainer projectingly mounted at the leading edge of the flap and pivotally supported at the tip end thereof at the other end of the swing arm by the first spherical bearing, a second spherical bearing, a third spherical bearing, a support link pivotally supported at one end thereof at the other end of the carriage by the second spherical bearing and at the other end thereof at a base end of the retainer by the third spherical bearing, a pivot, a universal joint, a fourth spherical bearing, an actuator, a drive arm having first and second arm portions extending radially from the pivot, and a push rod pivotally supported at one end thereof on the second arm portion of the drive arm by the universal joint and at the other end thereof on the intermediate portion of the swing arm by the fourth spherical bearing, wherein the swing arms, the carriages, the mid-links, the retainers and the support links of the link units are disposed in analogous shapes having a size ratio equal to the ratio between chord lengths of the main wing at the positions of the link units; the second arm of the drive arm, the push rod and a portion of the swing arm between the first fulcrum pin and the fourth spherical bearing in each of the link units are disposed in analogous shapes; and the first arm portions of the drive arms in the link units are interconnected by the connecting rod, whereby the link units are swung through the same angle by the actuator.

5. A flap operating device according to claim 4, wherein when an aerodynamic load is applied to the flap, the connecting rod receives a tensile strength.

* * * * *